(12) United States Patent
Stenneth et al.

(10) Patent No.: US 11,879,739 B2
(45) Date of Patent: Jan. 23, 2024

(54) METHOD, APPARATUS AND COMPUTER PROGRAM PRODUCT FOR ESTIMATING HAZARD DURATION

(71) Applicant: HERE GLOBAL B.V., Eindhoven (NL)

(72) Inventors: Leon Stenneth, Chicago, IL (US); Amarnath Nayak, Mumbai (IN); Alex Averbuch, Buffalo Grove, IL (US); Bruce Bernhardt, Chicago, IL (US)

(73) Assignee: HERE GLOBAL B V, Eindhoven (NL)

( * ) Notice: Subject to any disclaimer, the term of this patent is extended or adjusted under 35 U.S.C. 154(b) by 356 days.

(21) Appl. No.: 17/305,868

(22) Filed: Jul. 16, 2021

(65) Prior Publication Data

US 2023/0017376 A1 Jan. 19, 2023

(51) Int. Cl.
*G01C 21/34* (2006.01)
*G06N 20/00* (2019.01)

(52) U.S. Cl.
CPC ..... *G01C 21/3415* (2013.01); *G01C 21/3461* (2013.01); *G01C 21/3492* (2013.01); *G06N 20/00* (2019.01)

(58) Field of Classification Search
CPC ............ G01C 21/3415; G01C 21/3461; G01C 21/3492; G06N 20/00
See application file for complete search history.

(56) References Cited

U.S. PATENT DOCUMENTS

| | | | |
|---|---|---|---|
| 6,871,067 B2 | 3/2005 | Clark et al. | |
| 7,376,509 B2 | 5/2008 | Endo et al. | |
| 8,103,435 B2 | 1/2012 | Yang et al. | |
| 10,460,004 B1 | 10/2019 | Yanacek et al. | |
| 11,274,929 B1* | 3/2022 | Afrouzi ................ | G05D 1/0219 |
| 2007/0103294 A1* | 5/2007 | Bonecutter ............ | G08B 25/10 |
| | | | 340/539.18 |
| 2013/0253808 A1 | 9/2013 | He et al. | |
| 2016/0182707 A1* | 6/2016 | Gabel .................... | G06Q 10/10 |
| | | | 455/404.2 |
| 2018/0188742 A1* | 7/2018 | Wheeler ............. | G06F 16/9537 |

(Continued)

OTHER PUBLICATIONS

Jeihani et al., "Traffic Recovery Time Estimation Under Different Flow Regimes in Traffic Simulation", Journal of Traffic and Transportation Engineering (English Edition), vol. 2, Issue 5, (Oct. 2015), 10 pages.

(Continued)

*Primary Examiner* — Seth A Silverman

(57) ABSTRACT

Embodiments described herein may provide a method for identifying the location of a hazard, evaluating how long that hazard is likely to be present at the location, and providing an indication of the time to live of the hazard. Methods may include: receiving an indication of a hazard event, where the hazard event includes a timestamp and a location; map matching the location of the hazard event to a map-matched road segment; determining a time to live of the hazard event based, at least in part, on the timestamp and the map-matched road segment; providing an indication of the time to live of the hazard event as at least one of a database entry or a map user interface element; and providing for at least one of route guidance or navigational assistance based, at least in part, on the time to live of the hazard event.

20 Claims, 11 Drawing Sheets

(56) References Cited

U.S. PATENT DOCUMENTS

| | | | |
|---|---|---|---|
| 2018/0276485 A1* | 9/2018 | Heck | G06N 7/01 |
| 2018/0286234 A1* | 10/2018 | Rider | G08G 1/04 |
| 2019/0049970 A1* | 2/2019 | Djuric | B60W 60/00276 |
| 2019/0318550 A1* | 10/2019 | Lakshamanan | B60W 30/00 |
| 2021/0081559 A1* | 3/2021 | Gratton | H04W 4/02 |
| 2021/0199444 A1* | 7/2021 | Xie | G06F 16/957 |
| 2022/0070619 A1* | 3/2022 | White | H04M 1/72454 |

OTHER PUBLICATIONS

Saka et al., "Estimation of Traffic Recovery Time for Different Flow Regimes on Freeways", State Highway Administration Research Report, Department of Transportation and Urban Infrastructure Studies, School of Engineering, Morgan State University (Jul. 2008), 77 pages.

Tang et al., "Traffic Incident Clearance Time Prediction and Influencing Factor Analysis Using Extreme Gradient Boosting Model", Journal of Advanced Transportation, vol. 2020, Article ID 6401082, (Jun. 9, 2020), 12 pages.

Lopes et al., "Dynamic Forecast of Incident Clearance Time Using Adaptive Artificial Neural Network Models", Transportation Research Board 92nd Annual Meeting, (Jan. 2013), 17 pages.

Tizghadam et al., "Machine Learning in Transportation", Journal of Advanced Transportation, vol. 2019, (Jun. 4, 2019), 183 pages.

Yuan et al., "Bus Dynamic Travel Time Prediction: Using a Deep Feature Extraction Framework Based on RNN and DNN", Electronics 2020, vol. 9, No. 11, (Nov. 8, 2020), 20 pages.

\* cited by examiner

| Country | City | Road feature | Season | Mean recovery time (mins) | 1 Std Dev | Min recovery time | Max revovery time |
|---|---|---|---|---|---|---|---|
| Germany | Stuttgart | FC1 | Winter | 38 | 3.6 | 34.4 | 41.6 |
| Germany | Stuttgart | FC1 | Summer | 30 | 2.8 | 27.2 | 32.8 |
| Germany | Stuttgart | FC1 | Autumn | 32 | 3 | 29 | 35 |
| Germany | Stuttgart | FC1 | Sprint | 28 | 2 | 26 | 30 |

FIG. 6

| Road class | Speed limit KPH | Number of tow trucks within X km | ... | Urban flag | Number of lanes | Time of day | Ground truth recovery time |
|---|---|---|---|---|---|---|---|
| Fc 5 | 40 | 3 | ... | True | 1 | midday | 35 minutes |
| Fc1 | 80 | 0 | ... | False | 2 | evening | 63 minutes |
| Fc1 | 60 | 1 | ... | True | 2 | Night time | 45 minutes |
| ... | ... | ... | ... | ... | ... | ... | ... |

FIG. 7

| event id | Event type | Location | Start time | Time to live |
|---|---|---|---|---|
| E123 | accident | lat1, lon1 | 12:55 | 35 minutes |
| E124 | Broken down vehicle | Lat2, lon3 | 1:35 | 42 minutes |
| E828 | accident | Lat3, lon3 | 5:32 | 5 minutes |
| E727 | Broken down vehicle | Lat4, lon4 | 1:21 | 2 minutes: 30 seconds |
| ... | ... | ... | ... | ... |

FIG. 10

METHOD, APPARATUS AND COMPUTER PROGRAM PRODUCT FOR ESTIMATING HAZARD DURATION

TECHNOLOGICAL FIELD

An example embodiment of the present invention relates generally to identifying hazards and estimating how long they will be present, and more particularly, to a method, apparatus and computer program product for identifying the location of a hazard, evaluating how long that hazard is likely to be present at the location, and providing an indication of the time to live of the hazard.

BACKGROUND

The advent of digital maps that include up-to-date dynamic data regarding conditions affecting travel within a geographic region has transformed the way in which people travel. Routing algorithms can determine the most efficient path from an origin to a destination at a given time and guide a user along the established route. Further, traffic information can be updated as a user travels along the route and can be provided to the user as needed. Beyond traffic data, weather data can be provided for geographic regions that can affect travel where the weather data can be used by a person to make informed decisions about where they are traveling. These technological developments have improved the efficiency with which people travel and can provide people with a reasonable estimate of their time of arrival at a destination.

One drawback to digital maps is the reliance upon current conditions when generating routes from an origin to a destination. Routes that may involve hours of driving may be generated based on a static snapshot of available paths to a destination. This type of routing, while often satisfactory, may lack some degree of accuracy based on changing conditions along a route.

BRIEF SUMMARY

A method, apparatus, and computer program product are therefore provided for identifying hazards and estimating how long they will be present, and more particularly, to a method, apparatus and computer program product for identifying the location of a hazard, evaluating how long that hazard is likely to be present at the location, and providing an indication of the time to live of the hazard. Embodiments include an apparatus including at least one processor and at least one non-transitory memory including computer program code instructions, the computer program code instructions may be configured to, when executed, cause the apparatus to at least: receive an indication of a hazard event, where the hazard event includes a timestamp and a location; map match the location of the hazard event to a map-matched road segment; determine a time to live of the hazard event based, at least in part, on the timestamp and the map-matched road segment; provide an indication of the time to live of the hazard event as at least one of a database entry or a map user interface element; and provide for at least one of route guidance or navigational assistance based, at least in part, on the time to live of the hazard event.

According to some embodiments, causing the apparatus to provide an indication of the time to live of the hazard event as at least one of a database entry or a map user interface element includes causing the apparatus to provide on a map user interface a location of the hazard event and a time to live countdown timer indicating a duration until traffic along the map-matched road segment returns to a pre-hazard event condition. The time to live of the hazard event is based, in some embodiments, on at least one of a time of day of the timestamp, day of week of the time stamp, weather condition at the location at a time of the timestamp, or a functional class of the map-matched road segment. Causing the apparatus of some embodiments to determine a time to live of the hazard event includes causing the apparatus to enter the timestamp and the map-matched road segment as inputs to a machine learning model, where an output of the machine learning model is the time to live of the hazard event, and where the machine learning model is trained based on historical hazard events and contextual elements thereof.

According to some embodiments, causing the apparatus to provide for at least one of route guidance or navigational assistance based, at least in part, on the time to live of the hazard event includes causing the apparatus to: identify the hazard event along a planned route to a destination; determine a time of arrival at the location of the hazard event; determine if the time to live of the hazard event will have expired at the time of arrival; and re-route the planned route to the destination in response to the time of arrival at the location of the hazard event being before the time to live of the hazard event will have expired. According to some embodiments, the apparatus is caused to maintain the planned route to the destination in response to the time of arrival at the location of the hazard event being after the time to live of the hazard event will have expired. Causing the apparatus of some embodiments to map match the location of the hazard event to a map-matched road segment includes causing the apparatus to identify the map-matched road segment based on a location of the hazard event and a direction of travel associated with the hazard event.

Embodiments provided herein include a computer program product having at least one non-transitory computer-readable storage medium having computer-executable program code instructions stored therein, the computer-executable program code instructions including program code instructions to: receive an indication of a hazard event, where the hazard event includes a timestamp and a location; map match the location of the hazard event to a map-matched road segment; determine a time to live of the hazard event based, at least in part, on the timestamp and the map-matched road segment; provide an indication of the time to live of the hazard event as at least one of a database entry or a map user interface element; and provide for at least one of route guidance or navigational assistance based, at least in part, on the time to live of the hazard event.

According to some embodiments, the program code instructions to provide an indication of the time to live of the hazard event as at least one of a database entry or a map user interface element include program code instructions to provide on a map user interface a location of the hazard event and a time to live countdown timer indicating a duration until traffic along the map-matched road segment returns to a pre-hazard event condition. The time to live of the hazard event is, in some embodiments, based at least in part on at least one of a time of day of the timestamp, a day of week of the timestamp, weather condition at the location at a time of the time stamp, or a functional class of the map-matched road segment. According to some embodiments, the program code instructions to determine the time to live of the hazard event include program code instructions to enter the time stamp and the map-matched road segment as inputs to a machine learning model, where an output of the machine learning model is the time to live of the hazard event, and where the machine learning model is trained based on historical hazard events and contextual elements thereof.

According to some embodiments, the program code instructions to provide for at least one of route guidance or navigational assistance based, at least in part, on the time to live of the hazard event include program code instructions to: identify the hazard event along a planned route to a destination; determine a time of arrival at the location of the hazard event; determine if the time to live of the hazard event will have expired at the time of arrival; and re-route the planned route to the destination in response to the time of arrival at the location of the hazard event being before the time to live of the hazard event will have expired. Embodiments optionally include program code instructions to maintain the planned route to the destination in response to the time of arrival at the location of the hazard event being after the time to live of the hazard event will have expired. The program code instructions to map match the location of the hazard event to the map-matched road segment of some embodiments include program code instructions to identify the map-matched road segment based on a location of the hazard event and a direction of travel associated with the hazard event.

Embodiments provided herein include a method including: receiving an indication of a hazard event, where the hazard event includes a timestamp and a location; map matching the location of the hazard event to a map-matched road segment; determining a time to live of the hazard event based, at least in part, on the timestamp and the map-matched road segment; providing an indication of the time to live of the hazard event as at least one of a database entry or a map user interface element; and providing for at least one of route guidance or navigational assistance based, at least in part, on the time to live of the hazard event.

According to some embodiments, providing an indication of the time to live of the hazard event as at least one of a database entry or a map user interface element includes providing on a map user interface a location of the hazard event and a time to live countdown timer indicating a duration until traffic along the map-matched road segment returns to a pre-hazard event condition. The time to live of the hazard event is based, in some embodiments, at least in part on at least one of a time of day of the timestamp, a day of week of the timestamp, weather condition at the location at a time of the timestamp, or a functional class of the map-matched road segment.

According to some embodiments, determining a time to live of the hazard event includes entering the timestamp and the map-matched road segment as inputs to a machine learning model, where an output of the machine learning model is the time to live of the hazard event, and where the machine learning model is trained based on historical hazard events and contextual elements thereof. According to some embodiments, providing for at least one of route guidance or navigational assistance based, at least in part, on the time to live of the hazard event includes: identifying the hazard event along a planned route to a destination; determining a time of arrival at the location of the hazard event; determining if the time to live of the hazard event will have expired at the time of arrival; and re-routing the planned route to the destination in response to the time of arrival at the location of the hazard event being before the time to live of the hazard event will have expired. Methods optionally include maintaining the planned route to the destination in response to the time of arrival at the location of the hazard event being after the time to live of the hazard event will have expired.

Embodiments provided herein include an apparatus including: means for receiving an indication of a hazard event, where the hazard event includes a timestamp and a location; means for map matching the location of the hazard event to a map-matched road segment; means for determining a time to live of the hazard event based, at least in part, on the timestamp and the map-matched road segment; means for providing an indication of the time to live of the hazard event as at least one of a database entry or a map user interface element; and means for providing for at least one of route guidance or navigational assistance based, at least in part, on the time to live of the hazard event.

According to some embodiments, the means for providing an indication of the time to live of the hazard event as at least one of a database entry or a map user interface element includes means for providing on a map user interface a location of the hazard event and a time to live countdown timer indicating a duration until traffic along the map-matched road segment returns to a pre-hazard event condition. The time to live of the hazard event is based, in some embodiments, at least in part on at least one of a time of day of the timestamp, a day of week of the timestamp, weather condition at the location at a time of the timestamp, or a functional class of the map-matched road segment.

According to some embodiments, the means for determining a time to live of the hazard event includes entering the timestamp and the map-matched road segment as inputs to a machine learning model, where an output of the machine learning model is the time to live of the hazard event, and where the machine learning model is trained based on historical hazard events and contextual elements thereof. According to some embodiments, the means for providing for at least one of route guidance or navigational assistance based, at least in part, on the time to live of the hazard event includes: means for identifying the hazard event along a planned route to a destination; means for determining a time of arrival at the location of the hazard event; means for determining if the time to live of the hazard event will have expired at the time of arrival; and means for re-routing the planned route to the destination in response to the time of arrival at the location of the hazard event being before the time to live of the hazard event will have expired. An example apparatus optionally includes means for maintaining the planned route to the destination in response to the time of arrival at the location of the hazard event being after the time to live of the hazard event will have expired.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention in any way. It will be appreciated that the scope of the invention encompasses many potential embodiments in addition to those here summarized, some of which will be further described below.

BRIEF DESCRIPTION OF THE DRAWINGS

Figure 1:
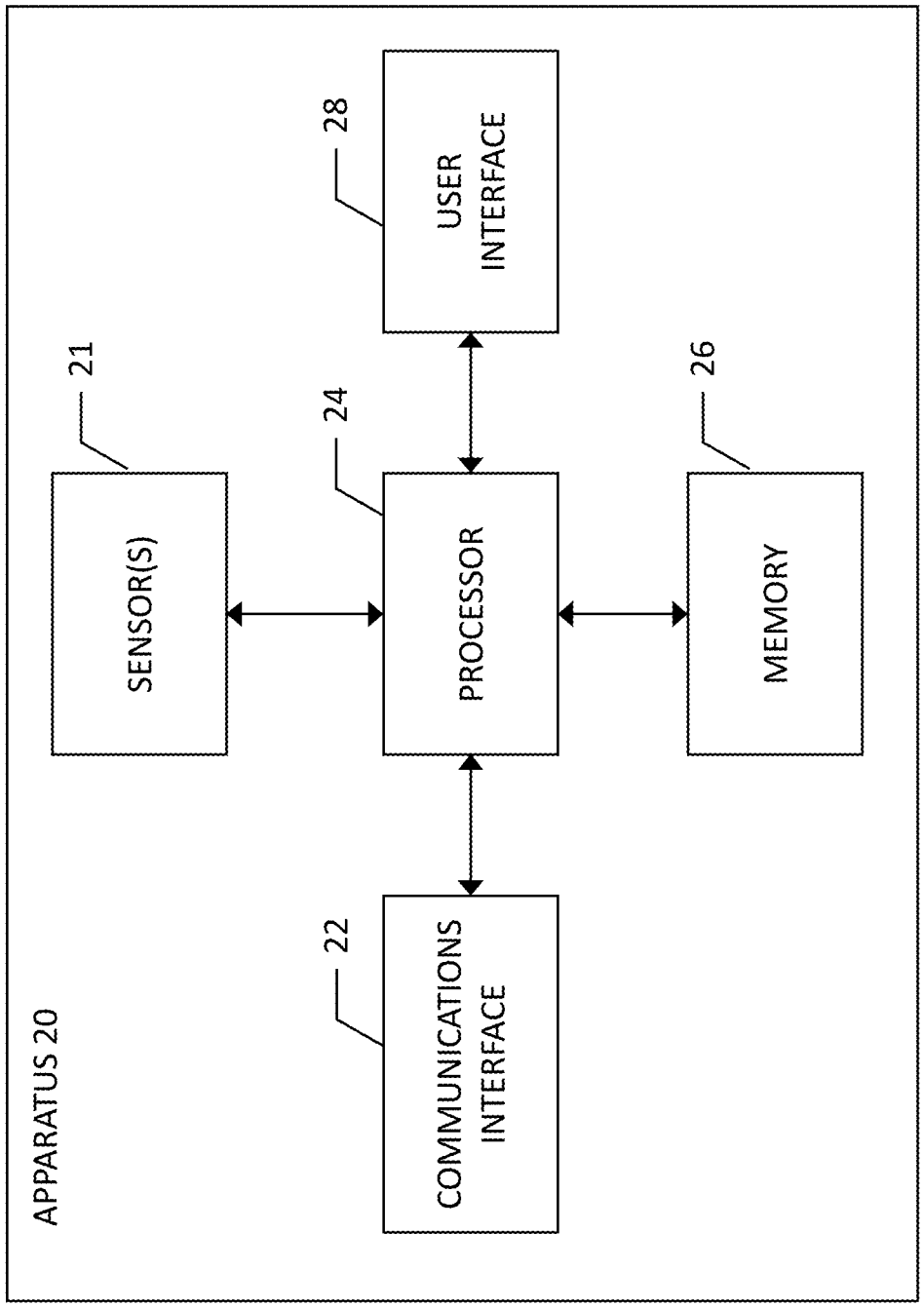
Figure 2:
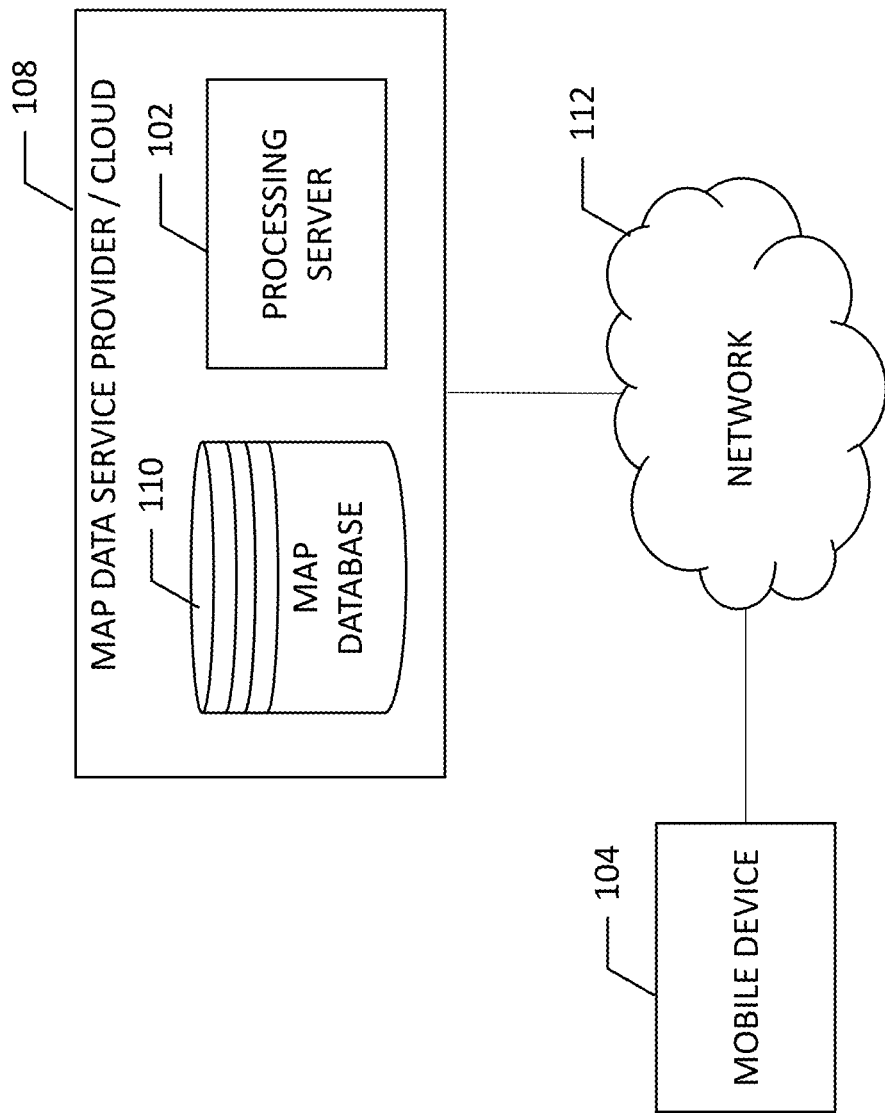
Figure 3:
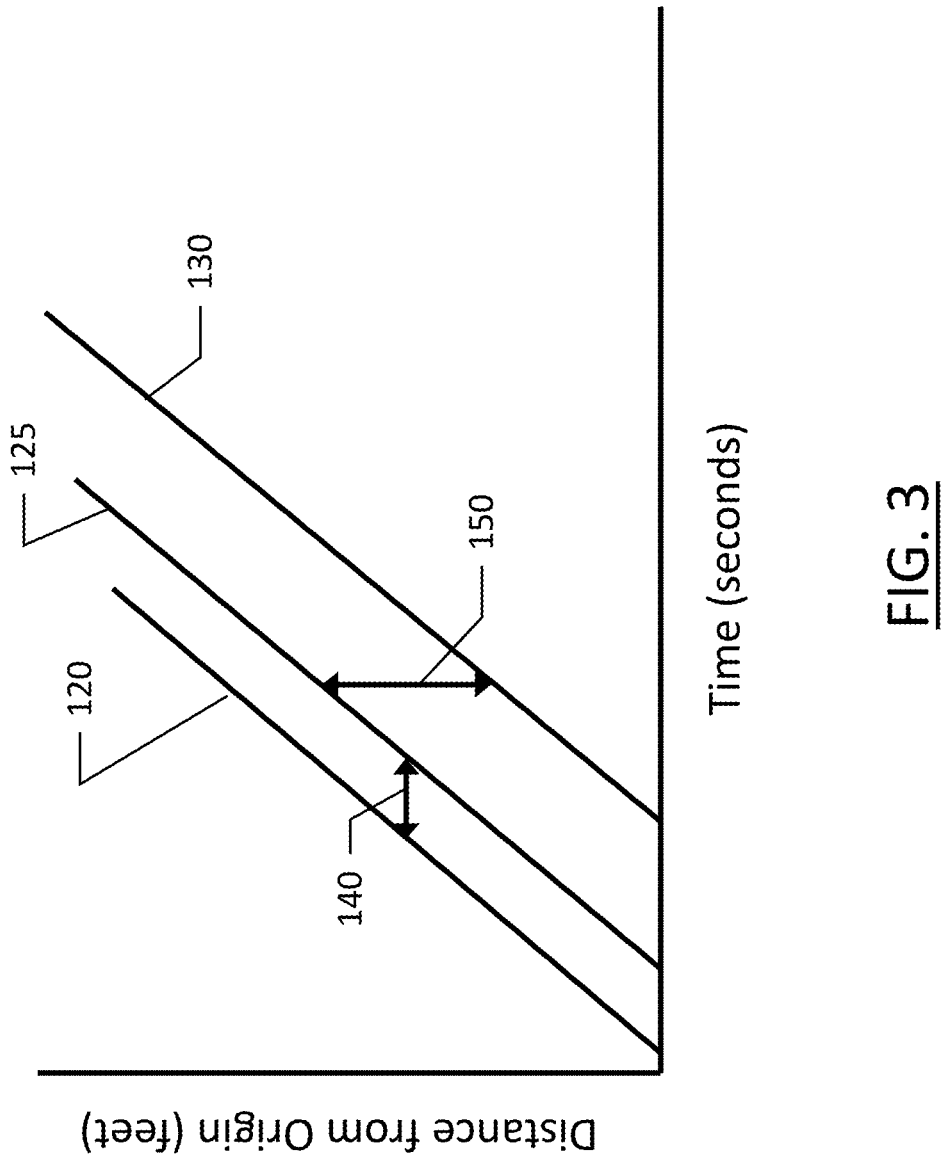
Figure 4:
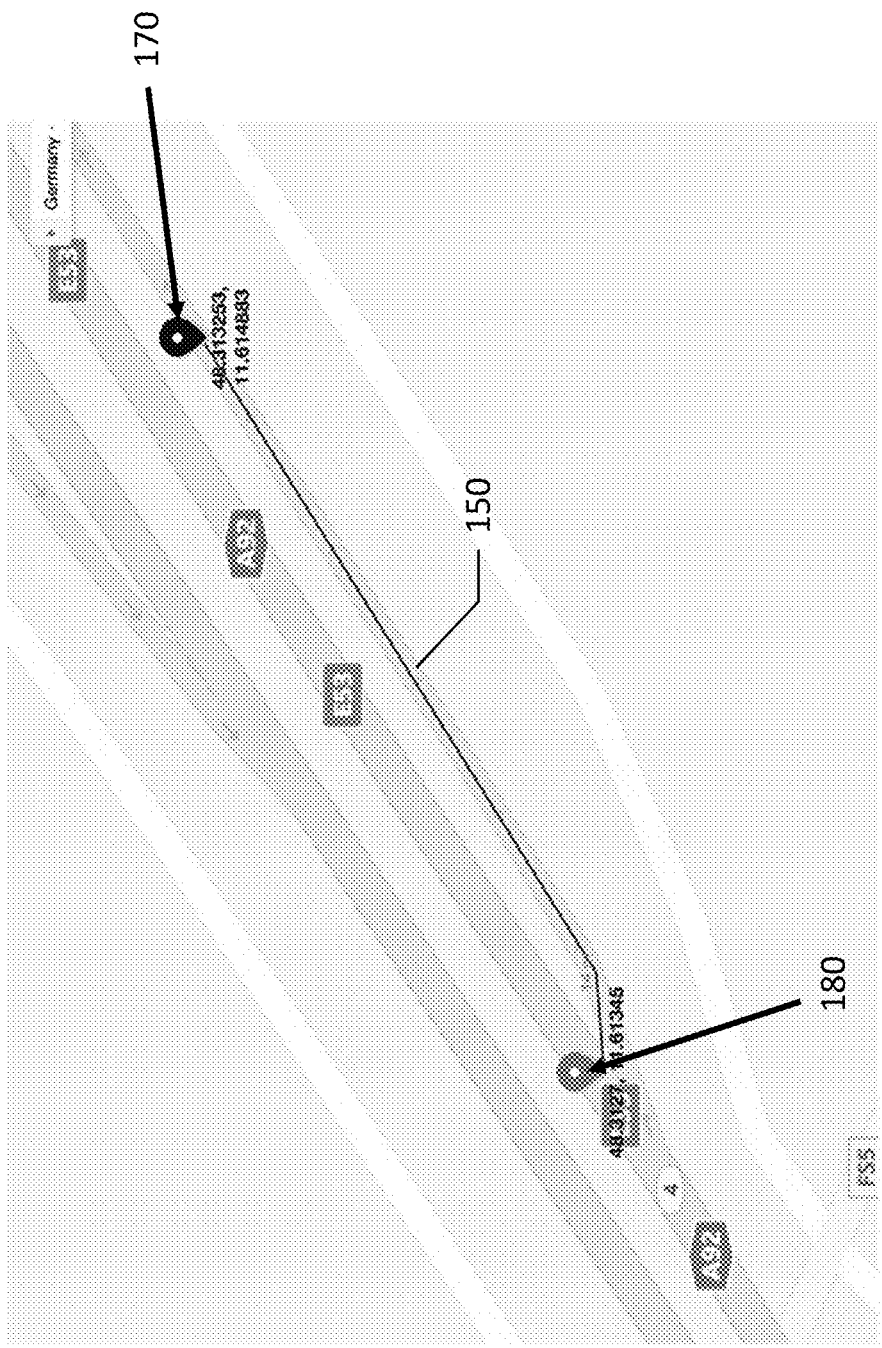
Figure 5:
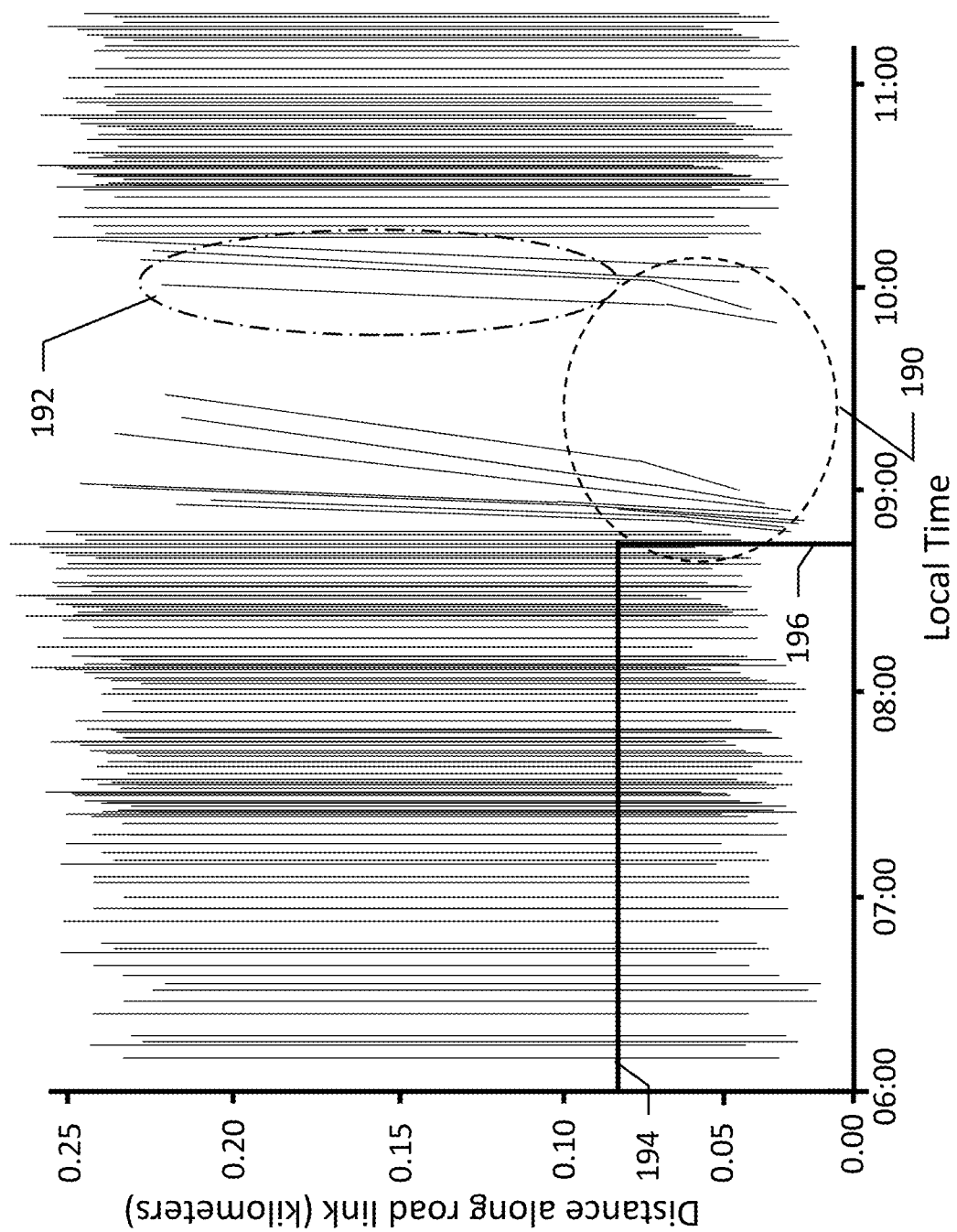
Figure 8:
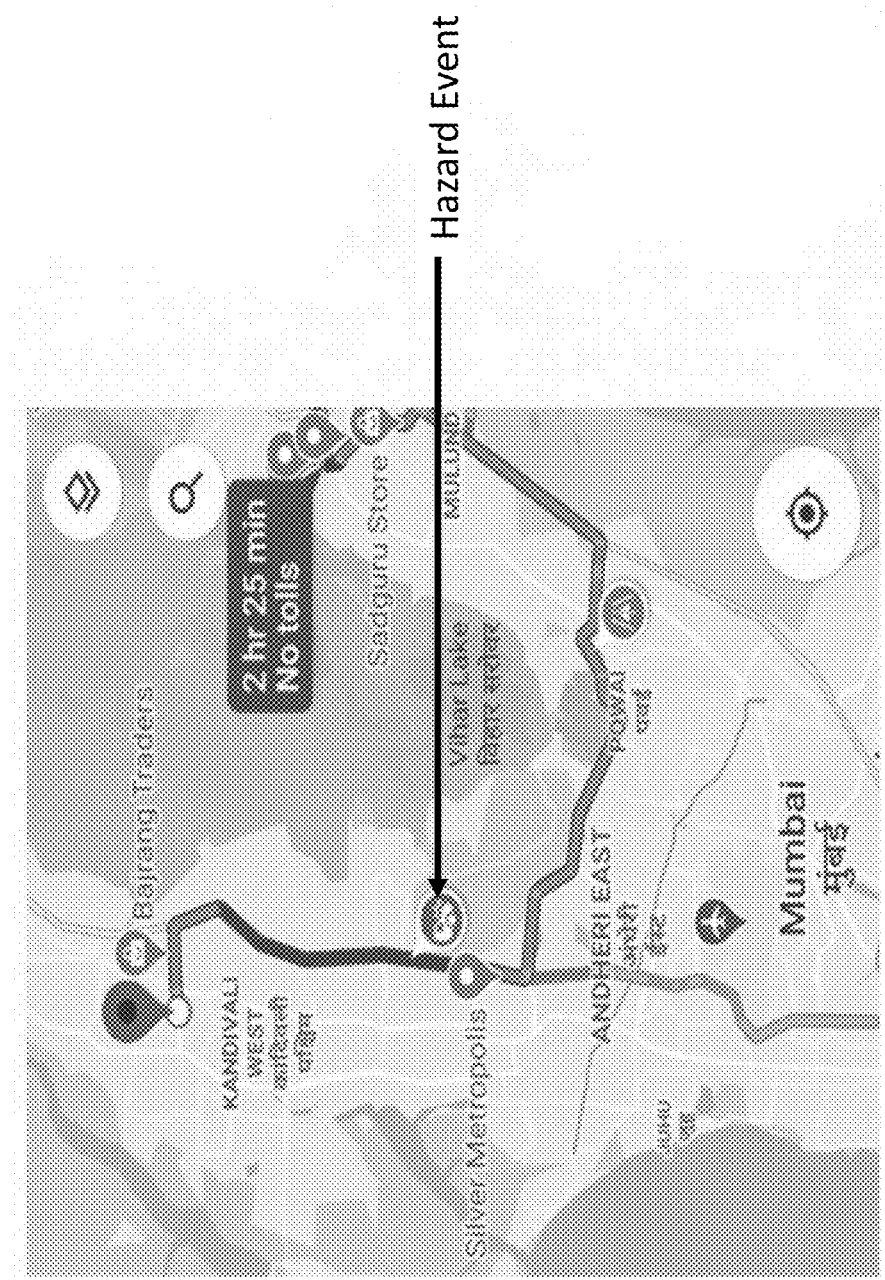
Figure 9:
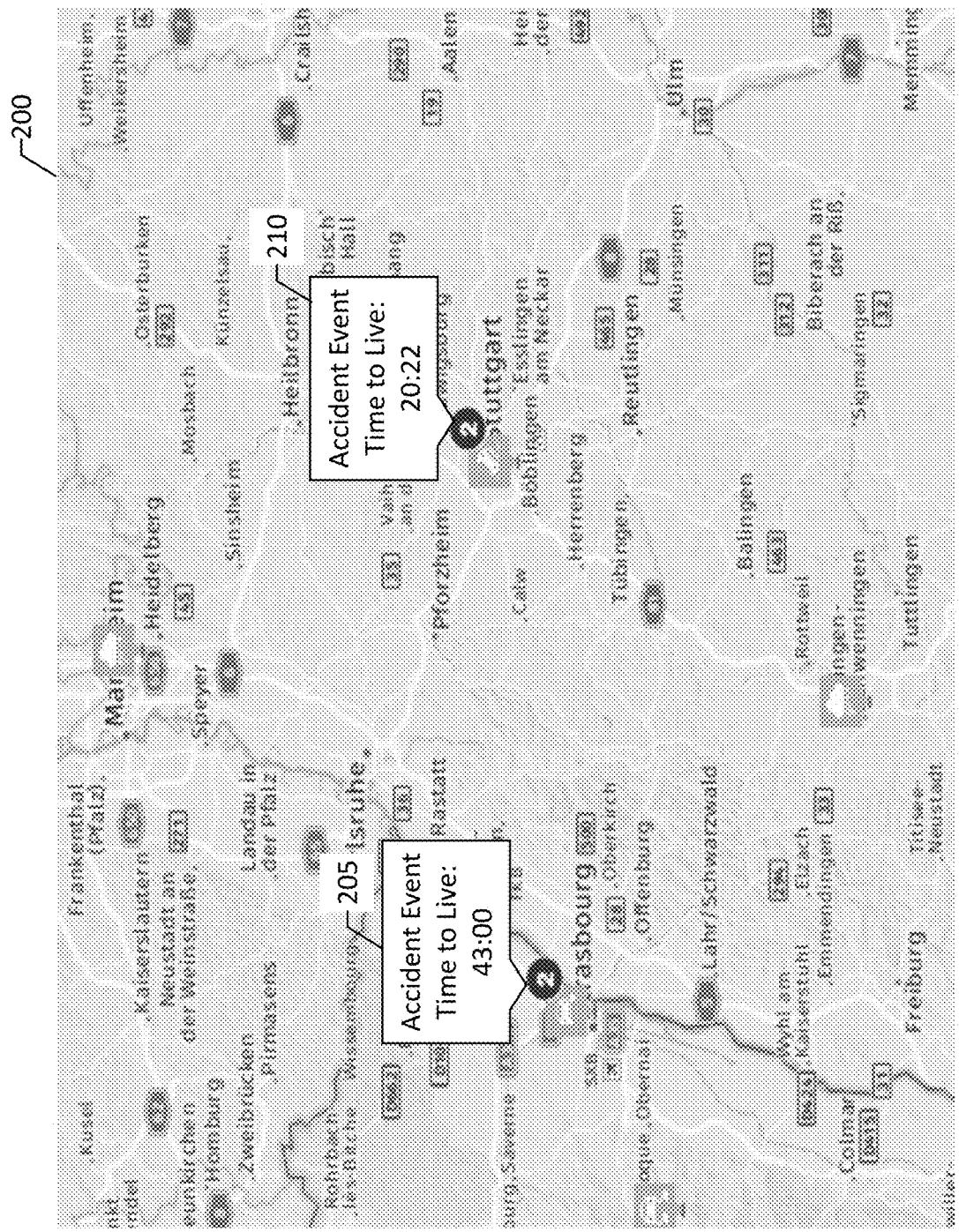
Figure 11:
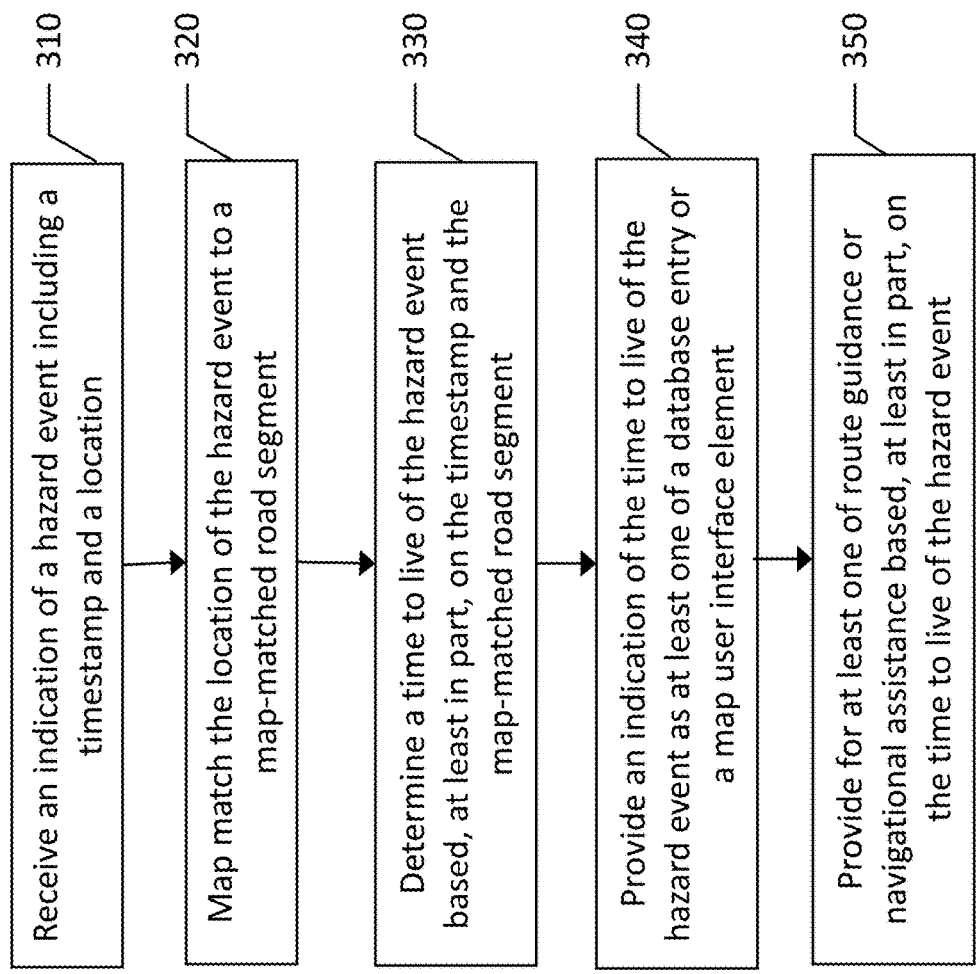

Having thus described certain example embodiments of the present disclosure in general terms, reference will hereinafter be made to the accompanying drawings which are not necessarily drawn to scale, and wherein:

FIG. 1 is a block diagram of an apparatus according to an example embodiment of the present disclosure;

FIG. 2 is a block diagram of a system for generating a dynamic time to live and/or providing for display of a dynamic time to live of a hazard event according to an example embodiment of the present disclosure;

FIG. 3 illustrates a time-space diagram for several vehicles along a road segment according to an example embodiment of the present disclosure;

FIG. 4 illustrates an indication of a hazard event along a road segment according to an example embodiment of the present disclosure;

FIG. 5 illustrates a time-space diagram for the hazard event of FIG. 4 according to an example embodiment of the present disclosure;

FIG. 6 illustrates a table representing a database of hazard event dynamic time to live for a variety of hazard events and contexts based on an analysis of historical hazard event data according to an example embodiment of the present disclosure;

FIG. 7 illustrates a table representing a database of training data for a machine learning model configured to determine dynamic time to live of a hazard event according to an example embodiment of the present disclosure;

FIG. 8 illustrates a route from an origin to a destination including a hazard event along the route affecting the time of arrival according to an example embodiment of the present disclosure;

FIG. 9 illustrates a map user interface including user interface elements depicting two hazard events and time to live countdown timers for each according to an example embodiment of the present disclosure;

FIG. 10 illustrates a database of hazard events including their start time and their time to live countdown timers while the hazard events remain present according to an example embodiment of the present disclosure; and FIG. 11 is a flowchart of a method for generating dynamic time to live for hazard events and for providing the dynamic time to live information for use in routing and/or navigation according to an example embodiment of the present disclosure.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

A method, apparatus and computer program product are provided in accordance with an example embodiment of the present disclosure for identifying hazards and estimating how long they will be present, and more particularly, to a method, apparatus and computer program product for identifying the location of a hazard, evaluating how long that hazard is likely to be present at the location, and providing an indication of the time to live of the hazard. Guidance may be provided to a user based on the time to live of the hazard at the location. This guidance may include, for example, navigational assistance, autonomous vehicle guidance, alternative route information, or the like. In this regard, a user interface of a device, such a mobile device or a device affixed to a vehicle, such as to a dashboard or the like, may provide hazard warnings to a user including how long the hazard is likely to be present, which may aid the user in navigation or driving in an instance in which the user is traveling by vehicle. The display of a device such as a navigation system may provide information to a driver about hazards at or near their current location or hazards that are upcoming along their route or potential route. Further, such hazard warnings may be used by autonomous vehicle controls to provide some degree of control responsive to the hazardous condition identified provided the quality score satisfies a predetermined value.

As described herein, example embodiments of the claims may provide for determining the time to live of a hazard and providing that information for the benefit of a user. The hazard indication and time to live may be provided to a user via any available device, such as a mobile phone, tablet computer, fixed computer (e.g., desktop computer), or the like. Optionally, the hazard location and time to live may be provided to autonomous or semi-autonomous vehicle controls to aid the autonomous controls in providing safe travel along a road network. One example embodiment that will be described herein includes a user device of a user traveling in a vehicle. Such a device may be a mobile personal device that a user may use within a vehicle and outside of a vehicle environment, while other devices may include a vehicle navigation system. In some embodiments, the mobile personal device may double as a vehicle navigation system.

While the term "navigation system" is used herein to describe a device used to present map data, traffic data, etc., it is to be appreciated that such a navigation system can be used via a user interface without providing route guidance information. Route guidance is provided in response to a user entering a desired destination, and where a route between the origin or current location of a user and the destination is mapped and provided to the user. A navigation system may be used in the absence of a discrete destination to provide driver assistance and information, such as regarding the presence of hazards, their time to live, and options for avoiding such hazards.

Example embodiments described herein may provide a user device or navigation system where a portion of a user interface is used to present a local hazard warning to a user. A warning may include an alert to a user that an accident, stalled vehicle, roadway obstruction (e.g., a lost payload or delaminated tire tread), or adverse weather condition (e.g., fog, ice, etc.) is present proximate a user or along an intended path of a user. The warning may be generated based on crowd-sourced information from vehicles, where the vehicles may be configured to report instances of hazards. The warning may be provided to a user of a device via a user interface, which may indicate that the warning corresponds to a current location of the user, or an anticipated future location of the user. According to example embodiments described herein, a probability or confidence of the hazard condition relative to a location may also be provided to allow a user to determine any precautionary measures that may be necessary to avoid or prepare for the hazard conditions. Embodiments described herein further determine an estimated time to live for a hazard and provide that information to a user and/or to a system that can use the time to live of the hazard to make decisions regarding navigation.

In example embodiments, a navigation system user interface may be provided for driver assistance for a user traveling along a network of roadways. Optionally, embodiments described herein may provide assistance for autonomous or semi-autonomous vehicle control. Autonomous vehicle control may include driverless vehicle capability where all vehicle functions are provided by software and hardware to safely drive the vehicle along a path identified by the vehicle. Semi-autonomous vehicle control may be any level of driver assistance from adaptive cruise control, to lane-keep assist, or the like. Autonomous vehicle control is defined by six levels of vehicle autonomy established by the Society of Automotive Engineers (SAE). Level zero is a fully-manual vehicle driven by a person with no systems that guide the vehicle. Level five is a fully autonomous vehicle where the vehicle performs all driving tasks under all conditions, where there is zero human attention or interaction involved. Embodiments described herein can be employed in any of these levels of autonomy as with level zero, navigational assistance can be provided by a device that a user interprets and drives a vehicle with the aid of the navigational information. For level five or any level of at least some autonomy, embodiments can provide a time to live of a hazard and a vehicle can take any desired precautions.

Autonomous and semi-autonomous vehicles may use high-definition maps and an understanding of the context (e.g., traffic, weather, road construction, etc.) to help navigate and to control a vehicle along its path. In an instance in which a vehicle is subject to complete or partial autonomous control, hazard warnings may inform the vehicle enabling appropriate actions to be taken. Those actions may include re-routing to avoid or partially avoid hazardous conditions, or to alter the operational state of the vehicle according to the hazard. Such operational state adjustments may include transitioning from two-wheel-drive to all-wheel-drive, changing the operational state of a traction control system from a dry-condition setting to a wet or snowy/icy condition setting, altering the transmission shift strategy or pattern to use lower gearing, or the like.

FIG. 1 is a schematic diagram of an example apparatus configured for performing any of the operations described herein. Apparatus 20 is an example embodiment that may be embodied by or associated with any of a variety of computing devices that include or are otherwise associated with a device configured for gathering weather related information and/or for presenting local hazard warnings to a user via a user interface. For example, the computing device may be a mobile terminal, such as a personal digital assistant (PDA), mobile telephone, smart phone, personal navigation device, smart watch, tablet computer, camera or any combination of the aforementioned and other types of voice and text communications systems. Optionally, the computing device may be a fixed computing device, such as a built-in vehicular navigation device, assisted driving device, or the like.

Optionally, the apparatus may be embodied by or associated with a plurality of computing devices that are in communication with or otherwise networked with one another such that the various functions performed by the apparatus may be divided between the plurality of computing devices that operate in collaboration with one another.

The apparatus 20 may be equipped with any number of sensors 21, such as a global positioning system (GPS), Light Distancing and Ranging (LiDAR) sensor, humidity sensor, image capture sensor, precipitation sensor, accelerometer, and/or gyroscope. Any of the sensors may be used to sense information regarding the movement, positioning, or orientation of the device and for determining a weather condition at the location of the device as described herein according to example embodiments. In some example embodiments, such sensors may be implemented in a vehicle or other remote apparatus, and the information detected may be transmitted to the apparatus 20, such as by near field communication (NFC) including, but not limited to, Bluetooth™ communication, or the like.

The apparatus 20 may include, be associated with, or may otherwise be in communication with a communication interface 22, processor 24, a memory device 26 and a user interface 28. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (for example, a computer readable storage medium) comprising gates configured to store data (for example, bits) that may be retrievable by a machine (for example, a computing device like the processor). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

The processor 24 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 24 may be configured to execute instructions stored in the memory device 26 or otherwise accessible to the processor. Alternatively or additionally, the processor may be configured to execute hard coded functionality. As such, whether configured by hardware or software methods, or by a combination thereof, the processor may represent an entity (for example, physically embodied in circuitry) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (for example, the computing device) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

The apparatus 20 of an example embodiment may also include or otherwise be in communication with a user interface 28. The user interface may include a touch screen display, a speaker, physical buttons, and/or other input/output mechanisms. In an example embodiment, the processor 24 may comprise user interface circuitry configured to control at least some functions of one or more input/output mechanisms. The processor and/or user interface circuitry comprising the processor may be configured to control one or more functions of one or more input/output mechanisms through computer program instructions (for example, software and/or firmware) stored on a memory accessible to the processor (for example, memory device 24, and/or the like). In this regard, the apparatus 20 may interpret sensed data as certain weather conditions and establish location based on other sensor data, such as GPS data, for providing weather condition information for a specific location, for example.

The apparatus 20 of an example embodiment may also optionally include a communication interface 22 that may be any means such as a device or circuitry embodied in either hardware or a combination of hardware and software that is configured to receive and/or transmit data from/to other electronic devices in communication with the apparatus, such as by NFC, described above. Additionally or alternatively, the communication interface 22 may be configured to communicate over Global System for Mobile Communications (GSM), such as but not limited to Long Term Evolution (LTE). In this regard, the communication interface 22 may include, for example, an antenna (or multiple antennas) and supporting hardware and/or software for enabling communications with a wireless communication network. Additionally or alternatively, the communication interface 22 may include the circuitry for interacting with the antenna(s) to cause transmission of signals via the antenna(s) or to handle receipt of signals received via the antenna(s). In some environments, the communication interface 22 may alternatively or also support wired communication may alternatively support vehicle to vehicle or vehicle to infrastructure wireless links.

According to certain embodiments, the apparatus 20 may support a mapping or navigation application so as to present maps or otherwise provide navigation or driver assistance. In order to support a mapping application, the computing device may include or otherwise be in communication with a geographic database, such as may be stored in memory 26. For example, the geographic database includes node data records, road segment or link data records, point of interest (POI) data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques), for example. Furthermore, other positioning technology may be used, such as electronic horizon sensors, radar, LIDAR, ultrasonic and/or infrared sensors.

In example embodiments, a user device user interface and/or navigation system user interface may be provided to provide information or driver assistance to a user traveling along a network of roadways. Devices and systems may receive an indication of a current location of the user, and any location based hazard warnings associated with the current location of the device and user. While a service provider may be specifically configured to provide local hazard warnings to a user, such a service may be enhanced or improved through cooperation with a map-based service provider. A user in their home may be able to watch television, visit a website on the internet, or listen to a radio station to understand weather patterns and potential hazard warnings at their relatively stationary location. However, when traveling, a user's location may be readily changing and their ability to continually monitor weather conditions or potential hazards may be limited. As such, a navigation system may be an ideal counterpart to a location-based hazard warning system as described herein. It is, however, appreciated that example embodiments described herein can be implemented outside of a navigation system, such as on a user device or other device that may not necessarily also provide navigation services.

According to example embodiments, map service provider database may be used to provide driver assistance via a navigation system. FIG. 2 illustrates a communication diagram of an example embodiment of a system for implementing example embodiments described herein using a navigation system and a map data service provider. The illustrated embodiment of FIG. 2 includes a mobile device 104, which may be, for example, the apparatus 20 of FIG. 1, such as a mobile phone, an in-vehicle navigation system, an advanced driver assistance system (ADAS), or the like, and a map data service provider or cloud service 108. Each of the mobile device 104 and map data service provider 108 may be in communication with at least one of the other elements illustrated in FIG. 2 via a network 112, which may be any form of wireless or partially wireless network as will be described further below. Additional, different, or fewer components may be provided. For example, many mobile devices 104 may connect with the network 112. The map data service provider 108 may be cloud-based services and/or may operate via a hosting server that receives, processes, and provides data to other elements of the system.

The map data service provider may include a map database 110 that may include node data, road segment data or link data, point of interest (POI) data, traffic data or the like. The map database 110 may also include cartographic data, routing data, and/or maneuvering data. According to some example embodiments, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities. Optionally, the map database 110 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The map database 110 can include data about the POIs and their respective locations in the POI records. The map database 110 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database 110 can include event data (e.g., traffic incidents, construction activities, scheduled events, unscheduled events, etc.) associated with the POI data records or other records of the map database 110.

The map database 110 may be maintained by a content provider e.g., the map data service provider and may be accessed, for example, by the content or service provider processing server 102. By way of example, the map data service provider can collect geographic data and dynamic data to generate and enhance the map database 110 and dynamic data such as traffic-related data or location-based hazard warning data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LIDAR, can be used to generate map geometries directly or through machine learning as described herein. However, the most ubiquitous form of data that may be available is vehicle data provided by vehicles, such as mobile device 104, as they travel the roads throughout a region. These vehicles or probes may be embodied by mobile device 104 and may provide data to the map data service provider in the form of traffic speed/congestion data, weather information, location, speed, direction, etc.

The map database 110 may be a master map database stored in a format that facilitates updates, maintenance, and development. For example, the master map database or data in the master map database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device 104, for example. The navigation-related functions can correspond to vehicle navigation, pedestrian navigation, or other types of navigation. While example embodiments described herein generally relate to vehicular travel along roads, example embodiments may be implemented for pedestrian travel along walkways, bicycle travel along bike paths, boat travel along maritime navigational routes, etc. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the map data service provider 108 map database 110 may be a master geographic database, but in alternate embodiments, a client side map database may represent a compiled navigation database that may be used in or with end user devices (e.g., mobile device 104) to provide navigation and/or map-related functions. For example, the map database 110 may be used with the mobile device 104 to provide an end user with navigation features. In such a case, the map database 110 can be downloaded or stored on the end user device which can access the map database 110 through a wireless or wired connection, such as via a processing server 102 and/or the network 112, for example.

In one embodiment, as noted above, the end user device or mobile device 104 can be embodied by the apparatus 20 of FIG. 1 and can include an Advanced Driver Assistance System (ADAS) which may include an infotainment in-vehicle system or an in-vehicle navigation system, and/or devices such as a personal navigation device (PND), a portable navigation device, a cellular telephone, a smart phone, a personal digital assistant (PDA), a watch, a camera, a computer, and/or other device that can perform navigation-related functions, such as digital routing and map display. An end user can use the mobile device 104 for navigation and map functions such as guidance and map display, for example, and for determination of useful driver assistance information, according to some example embodiments. An embodiment implemented as an ADAS may at least partially control autonomous or semi-autonomous features of a vehicle with the assistance of establishing the vehicle.

An ADAS may be used to improve the comfort, efficiency, safety, and overall satisfaction of driving. Examples of such advanced driver assistance systems include semi-autonomous driver assistance features such as adaptive headlight aiming, adaptive cruise control, lane departure warning and control, curve warning, speed limit notification, hazard warning, predictive cruise control, adaptive shift control, among others. Other examples of an ADAS may include provisions for fully autonomous control of a vehicle to drive the vehicle along a road network without requiring input from a driver. Some of these advanced driver assistance systems use a variety of sensor mechanisms in the vehicle to determine the current state of the vehicle and the current state of the roadway ahead of the vehicle. These sensor mechanisms may include radar, infrared, ultrasonic, and vision-oriented sensors such as image sensors and light distancing and ranging (LiDAR) sensors.

Some advanced driver assistance systems may employ digital map data. Such systems may be referred to as map-enhanced ADAS. The digital map data can be used in advanced driver assistance systems to provide information about the road network, road geometry, road conditions, and other information associated with the road and environment around the vehicle. Unlike some sensors, the digital map data is not affected by the environmental conditions such as fog, rain, or snow. Additionally, the digital map data can provide useful information that cannot reliably be provided by sensors, such as curvature, grade, bank, speed limits that are not indicated by signage, lane restrictions, and so on. Further, digital map data can provide a predictive capability well beyond the driver's vision to determine the road ahead of the vehicle, around corners, over hills, or beyond obstructions. Accordingly, the digital map data can be a useful and sometimes necessary addition for some advanced driving assistance systems. In the example embodiment of a fully-autonomous vehicle, the ADAS uses the digital map data to determine a path along the road network to drive, such that accurate representations of the road are necessary, such as accurate representations of intersections and turn maneuvers there through.

Driver assistance information may be communicated to a user via a display, such as a display of user interface 28 of apparatus 20 of FIG. 1. The display may be a display of a mobile phone, or a screen of an in-vehicle navigation system, for example. In the presentation of the driver assistance information to the user it is important that the information is communicated clearly and in an easily understood manner such that a user may quickly understand the information presented. As a user of a navigation system may be driving a vehicle, it is important that the navigation information including driver assistance information is quickly and easily understood, without requiring substantial user interaction should additional information be needed by the driver.

According to some embodiments, the mobile device 104 of FIG. 2 may provide an indication of a hazard event to the map data service provider 108. The mobile device 104 may include a vehicle, and upon deployment of one or more airbags of the vehicle, the mobile device may report that deployment to the map data service provider. This hazard event report may serve multiple purposes. It may trigger a call for emergency responders to the location of the hazard event together with pertinent information (e.g., vehicle speed before an accident, number of airbags deployed, specific location, etc.); however, the hazard event report may also be used for traffic purposes, such as establishing the timestamp and location of a hazard event along a road segment. This may be used, as described below, for establishing a time to live of the hazard event. Further, the mobile device 104 may report additional information relating to the hazard event to the map data service provider 108.

Example embodiments provided herein provide a method of identifying hazards and estimating how long they will be present, and more particularly, to a method, apparatus and computer program product for identifying the location of a hazard, evaluating how long that hazard is likely to be present at the location, and providing an indication of the time to live of the hazard.

According to example embodiments provided herein, the time to live is a time duration for which a particular hazard is kept active without any new addition of the data. It is a measure of the time to recover or return to a pre-hazard state (e.g., for traffic to return to normal conditions). In the case of a vehicle accident as a hazard, a fixed time to live may be thirty minutes meaning that once an accident is detected, the hazard is kept active for thirty minutes. After thirty minutes, the situation is analyzed using fresh data to confirm that the hazard is cleared. While a fixed time to live may be used, not all accidents are equal, and a fixed time value may not reflect the time to live of the accident. Embodiments described herein compute a dynamic time to live per hazard rather than using a fixed value for all hazards. Embodiments described herein employ a scientific method to calculate a dynamic time to live based on specific conditions of a hazard derived from historic data. The time to live or recovery time of example embodiments is more accurate than available methods and the uncertainty related to traffic movement and traffic management is significantly reduced. Using a dynamic time to live enables more accurate arrival times and average vehicle speeds on a road possible. An example embodiment described herein uses a time-space diagram (TSD) to establish the dynamic time to live.

The data related to a hazard may be derived from a time space diagram, where input to generate the time-space diagram includes a location (e.g., latitude and longitude), time range (from a few minutes to hours), and a road link/segment information in sequence of the direction of travel. A time-space diagram of example embodiments includes time on the horizontal axis with distance from a reference point on the vertical axis. Trajectories of individual vehicles in motion may be portrayed in such a diagram by sloping lines, while stationary vehicles are represented by horizontal lines. The slope of the line in such a time-space diagram represents a speed of the respective vehicle. Curved portions of the trajectories represent vehicles undergoing changes in speed including acceleration and deceleration. FIG. 3 illustrates an example embodiment of such a time-space diagram with different vehicles represented by the different lines of the diagram including a first vehicle 120, a second vehicle 125, and a third vehicle 130. The spacing between vehicles in distance is shown by the arrow 150 as a delta along the vertical (distance) axis, while the time between vehicles or headway is shown by arrow 140 as a delta along the horizontal (time) axis.

FIG. 4 illustrates an example embodiment of an accident having occurred along a road. As shown, an accident has been identified at location 170 that is a distance away from the start of the road link (location 180) along which the accident occurred. The location 180 is the starting position for the time-space diagram of this particular accident at location 170. FIG. 5 illustrates the space-time diagram for the road link shown in FIG. 4 between the start of the road link (location 180) and the accident (location 170). As shown, the substantially vertical lines represent vehicles moving at normal speed. These lines are not perfectly vertical as that would represent infinite speed; however, as the timeline represents more than five hours, and the distance is only a quarter of a kilometer, the lines are close to vertical. Lines that are further from vertical represent slower speeds, while a horizontal line would represent a stopped vehicle at the position where the horizontal line extends on the distance axis. The illustrated sensor data indicates that the accident occurred at around 8:50 local time, where vehicles in the dashed border 190 have slowed considerably. Line 194 indicates the position along the road link at which point vehicle speeds slowed indicating the position of the accident along the road link at around 0.80 kilometers from the beginning of the road link. The vertical line 196 indicates the time at which vehicles began to slow, indicating that time is when the accident occurred. The dash-dot-dash border 192 illustrates sensor data reflecting a return to normal traffic speeds through the road link.

As illustrated in the time-space diagram of FIG. 5, the accident occurs at 8:50 and travel returned to normal around 10:00 am. Therefore, the time to live for the accident of this example is around one hour and ten minutes. This can be established from the time-space diagram from when the accident took place to the time when traffic is flowing normally again, which is evident in time-space diagram plots. When traffic is not flowing, there is a gap in the x-axis where there are no vehicles present. Using many examples along these lines, dynamic time to live values can be calculated.

Determining dynamic recovery time or time to live can involve consideration of a variety of factors. Accidents, broken-down vehicles, or other hazards can be classified based on country, state, city, etc. by map matching a location of the vehicle. Within each geographic region, an accident or other hazard can be further classified based on a functional class of the roadway along which the hazard occurs as determined by the map matching. The hazard's location and heading is used by the map matcher to classify the hazard in this way. The hazard time to live duration can be calculated for each hazard of a particular classification for a period of time (e.g., over the last two years) with a statistically significant sample size. This calculation can be based on data points spread over all seasons and other contextual factors, such as time of day (e.g., rush hour or not), day of the week (e.g., weekday vs. weekend), event (e.g., holiday, local sporting event, etc.), lighting (daylight, twilight, night, etc.), weather (e.g., rain, snow, clear, etc.), and other contextual clues that can factor in to the time to live duration. The hazard time to live of historical data points can be determined using the time-space diagram above and/or from first responder information or other municipal sources.

Hazard duration can be calculated for each geographic region (e.g., state), geographic sub region (e.g., city), road functional class, and context (season, time, lighting, weather, etc.). Outlier hazards can be removed from the samples using Z-score statistical measures or other standard deviation metrics. Statistics can be calculated for each sub-category (e.g., mean, median, standard deviation). The mean time from the sample size may be considered as the recovery time with +/− one standard deviation as the margin of error. The derived result may include a table, such as the table shown in FIG. 6 which depicts a country, city, road feature (functional class), weather, mean recovery time, and standard deviation to establish minimum and maximum recovery times. The table of FIG. 6 is merely an example that can be expanded to many rows containing various countries, cities, weather, season, etc. The table may be updated periodically, such as every three months, when at least a minimum number of samples are available for a respective category or row. Once the table is updated, the latest recovery time or time to live is provided to a service provider to use that information to benefit travel along the road network.

When there is a hazard detected, the event is detected in real-time through various available mechanisms. For example, an accident may be detected in real time through the deployment of airbags of a vehicle, and the vehicle providing this information to an OEM or a service provider. The map matched location of the vehicle is used to search a database of historical time to live recovery times as represented in FIG. 6. Given the map matched location and accident time stamp, the country, city, functional class, and weather (among other possible contextual clues) can be used to match the accident to a historical profile. The latest mean recovery time is then extracted from the database and used as the time to live for the accident. In this manner, given a real-time detection of an accident, the realistic, dynamic time to live can be established.

While historical data can be used to create average time to live recovery times for hazards based on categories and contexts, embodiments described herein can further employ machine learning to predict the time to live recovery time for a hazard. Embodiments described herein predict the time to live for a hazard based on location, time, and specific features. For this machine learning model, ground truth is obtained from historical hazard events. Sources for historical hazard events and ground truth can include airbag deployment detections (e.g., provided by OEMs or service providers), towing companies, first responders, or municipal sources, for example. Further, each of these sources can provide the time to recovery for each hazard event which can be used as ground truth to train the machine learning model. The time-space diagram described above can be used to further understand the time to live recovery time from a hazard event.

The machine learning model of example embodiments described herein includes features and labels. The features are derived primarily from the time and location of the hazard event. Embodiments employ supervised learning models. For example, classification models Random Forest, Decision Trees, or Logistic Regression can be used if the ground truth is categorized into low, medium, and high time to live. If the ground truth time to live is a continuous value, then a regression model may be employed. These include multilinear regression techniques such as Random Forest Regression.

Based on a location of a hazard event, features may be associated with the hazard event. These features may include a functional class of the road segment along which the hazard event occurred, the number of lanes of the road segment, the speed limit, the population density of the area around the hazard event (e.g., urban, rural, etc.), and other static features associated with the location. Additional features may include the number of tow trucks within a predefined distance, historical averages on arrival of first responders, and traffic densities. Features associated with a time of occurrence of the hazard event may include: season, time of day, day of week, weather, etc. The ground truth label of the hazard event includes the actual recovery time. This recovery time can be learned from historical data such as time-space diagrams of probe data in the vicinity of the hazard event. An additional source of historical data can include tow truck response information, first responder information, traffic camera information, and other municipal sources.

According to an example embodiment described herein, the training data may resemble the table of FIG. 7, where each tuple is a training example. As shown, the table of FIG. 7 includes a road functional class, speed limit, number of tow trucks within a predefine distance of an event, urban flag for an urban environment, number of lanes of the road segment, time of day, and ground truth recovery time. This information may train the machine learning model of example embodiments described herein.

Embodiments described herein predict the recovery time of a hazard event, such as an accident identified based on airbag deployment. The trained machine learning model, which may be maintained by map data service provider/cloud 108, can receive the hazard event information. Given a real-time hazard event detected from sensor data, the location information of the event and a timestamp are obtained. The location is map matched to a road link using a map matching method. After map matching, features associated with the road link and surrounding area are established. For example, map features extracted based on the road link may include the road link functional class, speed limit, number of lanes, urban/rural designation, etc. From the time stamp, details may be obtained such as the season, time of day, day of the week, etc. The weather can be obtained from a weather information source for the location of the event at the time of the event. Demographic features extracted may include the population density of the area where the hazard event occurred, the number of tow trucks within a predefined distance, etc. This extracted information is used as an input to the machine learning model. The machine learning model outputs a predicted time to live based on the input information.

The predicted time to live can be categorized as high, medium, and low, for example. The categorizing can be based on a length of time for the recovery time and thresholds set based on a relative measure. For example, a two hour recovery time may be a very long recovery time for an accident, such that this may be categorized as a high time to live measure. This may occur when there are certain mitigating circumstances, such as a large number of emergency vehicles deployed to the hazard event.

Once the time to live is calculated, as described above, it can be used in a variety of ways to benefit those traveling among a road network proximate the hazard event. While hazards such as vehicle accidents are often reported on digital maps based on a location of the accident, the knowledge of the presence of an accident is of limited value without understanding when it will be cleared and traffic proximate the accident return to normal. Embodiments described herein resolve this issue by providing an indication to a user regarding the time to live for a hazard event such that route planning can consider the time to live.

When a route is planned between an origin and a destination, traffic along that route is considered to establish the estimated time of arrival. If an accident is present along the route, the estimated time of arrival considers the traffic congestion associated with that accident and the estimated time of arrival is delayed accordingly. However, in the case of longer routes where a hazard is present during route generation (e.g., at the beginning of a journey), the hazard may be cleared by the time a person reaches that portion of their route, such that route alternatives may not need to be considered during route generation.

FIG. 8 illustrates an example embodiment of a route requested by a user from around Sadguru to Bajrang Traders with the estimated travel time being two hours and twenty-five minutes. However, there is a hazard event of an accident on the route. Based on the estimates, it would take around an hour and thirty minutes to get to the location of the hazard event and by that time the hazard event may be clear with the road back to free flowing traffic. Since the time to live is unknown, the user and routing algorithm cannot make an informed decision regarding the route to the destination. If the time to live is ten minutes, then it would be logical for the user to travel along the prescribed route as the hazard will be clear well before the hazard event location is reached. If the time to live is two hours, then an alternative route may be desirable since the hazard event is predicted to still be present by the time the hazard event location is reached. Hazard event time to live information is informative to users making routing decisions, along with routing algorithms and autonomous vehicles facing the same challenges of establishing the most efficient path to a destination.

Embodiments described herein provide an indication of the time to live for each hazard event in a mapped region. The time to live may be depicted as a countdown timer that shows a lower time to live as time progresses. According to an example embodiment, for each hazard event (e.g., vehicle accident, broken down vehicle, etc.) location that is provided for display on a map, a countdown timer of the time to live of the hazard event is also shown. Optionally, the time to live may be represented by an icon that changes visual appearance based on the amount of time left of the time to live for the event. For example, a circle that may have a swept portion depicting how much longer the time to live duration is, or a color-coded icon that shows color variation based on the time to live duration remaining. The time to live is the time to recovery and can be a dynamic value as detailed above. Optionally, the time to live can be based on a fixed value for an event if a dynamic value is not available. For example, if a hazard event occurs and there is insufficient information available to determine a dynamic value for the time to live, a default static value may be used (e.g., 30 minutes for a vehicle accident).

Different hazard events can each have different time to live values indicated on a map or published to a database. In this way, human drivers, autonomous vehicles, and navigational systems can use this time to live information to make informed routing decisions in traversing a road network. FIG. 9 illustrates an example embodiment of a map 200 which may be provided for display on an apparatus, such as on a mobile device 104, including two hazard event identified. As shown, these hazard events include additional information. A first hazard event is a traffic accident event 205 with a time to live duration of 43 minutes remaining. A second hazard event is another traffic accident event 210 with a time to live duration of 20 minutes and 22 seconds. These hazard events and their respective time to live counters may be updated periodically or continuously. For example, the timers could decrement in one minute increments as each minute passes, or may decrement by the second as each second passes. This information may be read by a user or system to facilitate routing and navigational decisions.

While the map display of FIG. 9 may be a reliable and intuitive way to communicate a time to live of a hazard event to a user or system, a database may optionally be used particularly for autonomous vehicle control and route guidance. An example of such a database is illustrated in FIG. 10, where a row can be added for each new hazard event until the time to live for the respective event expires and is purged from the database. The entries in the database can also be a feedback loop with the machine learning model described above whereby these data points become learning data upon establishing the actual time to live of the respective hazard events. The database of FIG. 10 can be used by navigation systems to inform routing decisions and by autonomous vehicles to inform path decisions as they travel along a road network.

Referring back to FIG. 9, the map display may be personalized for each user based on preferences of the user. For example, each user could choose a threshold time to live for the event to be displayed in their map. For example, if a user chose a threshold of four minutes, only hazard events with a time to live greater than four minutes may be presented to a user. According to the database of FIG. 10, this would include events E123, E124, and E828. If a user selected a threshold of six minutes, the hazard events and time to live counters only for hazard events E123 and E124 would be provided to the user.

Using example embodiments described herein, a user or a service provider can plan ahead as they are more aware about hazard events occurring along their route and the recovery time of each hazard event. Using this information, a system, such as map data service provider 108, can inform a user of a best route to a destination in view of the hazard events and when they will be clear. This may be particularly useful in the case of events occurring along a route where there are few, if any, suitable alternative routes, and a service provider may inform a user that waiting to depart for an additional thirty minutes may result in a similar arrival time as one or more hazard events may clear. This information can keep a user from sitting in traffic unnecessarily.

FIG. 11, described below, is a flowchart illustrative of methods according to example embodiments of the present disclosure. It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 26 of an apparatus employing an embodiment of the present invention and executed by a processor 24 of the apparatus 20. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

FIG. 11 illustrates a method for identifying hazards and estimating how long they will be present, and more particularly, to a method, apparatus and computer program product for identifying the location of a hazard, evaluating how long that hazard is likely to be present at the location, and providing an indication of the time to live of the hazard. As shown in FIG. 11, an indication of a hazard is received at 310 including a timestamp and a location. The location may include, for example, a latitude and longitude. Optionally, the location may include an elevation which may be particularly helpful for locations including bridges, overpasses, and tunnels, for example. The location of the hazard event is map-matched to a road segment at 320. This may be performed by any conventional map-matching technique. A time to live of the hazard event is determined at 330 based, at least in part, on the timestamp and the map-matched road segment. An indication of the time to live for the hazard event is provided at 340 as at least one of a database entry or a map user interface element. At 350, route guidance or navigational assistance is provided based, at least in part, on the time to live of the hazard event.

In an example embodiment, an apparatus for performing the method of FIG. 5 above may comprise a processor (e.g., the processor 24) configured to perform some or each of the operations (310-350) described above. The processor may, for example, be configured to perform the operations (310-350) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 310-350 may comprise, for example, the processor 24 and/or a device or circuit for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. An apparatus comprising at least one processor and at least one non-transitory memory including computer program code instructions, the computer program code instructions configured to, when executed, cause the apparatus to at least:
   receive an indication of a hazard event, where the hazard event comprises a timestamp and a location;
   map match the location of the hazard event to a map-matched road segment;
   determine a time to live of the hazard event based, at least in part, on the timestamp and the map-matched road segment;
   provide an indication of the time to live of the hazard event as at least one of a database entry or a map user interface element; and
   provide for at least one of route guidance or navigational assistance based, at least in part, on the time to live of the hazard event.

2. The apparatus of claim 1, wherein causing the apparatus to provide an indication of the time to live of the hazard event as at least one of a database entry or a map user interface element comprises causing the apparatus to provide on a map user interface the location of the hazard event and a time to live countdown timer indicating a duration until traffic along the map-matched road segment returns to a pre-hazard event condition.

3. The apparatus of claim 1, wherein the time to live of the hazard event is based, at least in part, on at least one of a time of day of the timestamp, day of week of the timestamp, weather condition at the location at a time of the timestamp, or a functional class of the map-matched road segment.

4. The apparatus of claim 3, wherein causing the apparatus to determine the time to live of the hazard event comprises causing the apparatus to enter the timestamp and the map-matched road segment as inputs to a machine learning model, wherein an output of the machine learning model is the time to live of the hazard event, and wherein the machine learning model is trained based on historical hazard events and contextual elements thereof.

5. The apparatus of claim 1, wherein causing the apparatus to provide for at least one of route guidance or navigational assistance based, at least in part, on the time to live of the hazard event comprises causing the apparatus to:
identify the hazard event along a planned route to a destination;
determine a time of arrival at the location of the hazard event;
determine if the time to live of the hazard event will have expired at the time of arrival; and
re-route the planned route to the destination in response to the time of arrival at the location of the hazard event being before the time to live of the hazard event will have expired.

6. The apparatus of claim 5, wherein the apparatus is further caused to:
maintain the planned route to the destination in response to the time of arrival at the location of the hazard event being after the time to live of the hazard event will have expired.

7. The method of claim 5, further comprising:
maintaining the planned route to the destination in response to the time of arrival at the location of the hazard event being after the time to live of the hazard event will have expired.

8. The apparatus of claim 1, wherein causing the apparatus to map match the location of the hazard event to the map-matched road segment comprises causing the apparatus to identify the map-matched road segment based on a location of the hazard event and a direction of travel associated with the hazard event.

9. The computer program product of claim 1, wherein the program code instructions to map match the location of the hazard event to the map-matched road segment comprise program code instructions to identify the map-matched road segment based on a location of the hazard event and a direction of travel associated with the hazard event.

10. A computer program product comprising at least one non-transitory computer-readable storage medium having computer-executable program code instructions stored therein, the computer-executable program code instructions comprising program code instructions to:
receive an indication of a hazard event, where the hazard event comprises a timestamp and a location;
map match the location of the hazard event to a map-matched road segment;
determine a time to live of the hazard event based, at least in part, on the timestamp and the map-matched road segment;
provide an indication of the time to live of the hazard event as at least one of a database entry or a map user interface element; and
provide for at least one of route guidance or navigational assistance based, at least in part, on the time to live of the hazard event.

11. The computer program product of claim 10, wherein the program code instructions to provide an indication of the time to live of the hazard event as at least one of a database entry or a map user interface element comprise program code instructions to provide on a map user interface the location of the hazard event and a time to live countdown timer indicating a duration until traffic along the map-matched road segment returns to a pre-hazard event condition.

12. The computer program product of claim 10, wherein the time to live of the hazard event is based, at least in part, on at least one of a time of day of the timestamp, day of week of the timestamp, weather condition at the location at a time of the timestamp, or a functional class of the map-matched road segment.

13. The computer program product of claim 12, wherein the program code instructions to determine the time to live of the hazard event comprise program code instructions to enter the timestamp and the map-matched road segment as inputs to a machine learning model, wherein an output of the machine learning model is the time to live of the hazard event, and wherein the machine learning model is trained based on historical hazard events and contextual elements thereof.

14. The computer program product of claim 10, wherein the program code instructions to provide for at least one of route guidance or navigational assistance based, at least in part, on the time to live of the hazard event comprise program code instructions to:
identify the hazard event along a planned route to a destination;
determine a time of arrival at the location of the hazard event;
determine if the time to live of the hazard event will have expired at the time of arrival; and
re-route the planned route to the destination in response to the time of arrival at the location of the hazard event being before the time to live of the hazard event will have expired.

15. The computer program product of claim 14, further comprising program code instructions to:
maintain the planned route to the destination in response to the time of arrival at the location of the hazard event being after the time to live of the hazard event will have expired.

16. A method comprising:
receiving an indication of a hazard event, where the hazard event comprises a timestamp and a location;
map matching the location of the hazard event to a map-matched road segment;
determining a time to live of the hazard event based, at least in part, on the timestamp and the map-matched road segment;
providing an indication of the time to live of the hazard event as at least one of a database entry or a map user interface element; and
providing for at least one of route guidance or navigational assistance based, at least in part, on the time to live of the hazard event.

17. The method of claim 16, wherein providing an indication of the time to live of the hazard event as at least one of a database entry or a map user interface element comprises providing on a map user interface the location of the hazard event and a time to live countdown timer indicating a duration until traffic along the map-matched road segment returns to a pre-hazard event condition.

18. The method of claim 16, wherein the time to live of the hazard event is based, at least in part, on at least one of a time of day of the timestamp, day of week of the timestamp, weather condition at the location at a time of the timestamp, or a functional class of the map-matched road segment.

19. The method of claim 18, wherein determining a time to live of the hazard event comprises entering the timestamp and the map-matched road segment as inputs to a machine learning model, wherein an output of the machine learning model is the time to live of the hazard event, and wherein the machine learning model is trained based on historical hazard events and contextual elements thereof.

20. The method of claim 16, wherein providing for at least one of route guidance or navigational assistance based, at least in part, on the time to live of the hazard event comprises:
- identifying the hazard event along a planned route to a destination;
- determining a time of arrival at the location of the hazard event;
- determining if the time to live of the hazard event will have expired at the time of arrival; and
- re-routing the planned route to the destination in response to the time of arrival at the location of the hazard event being before the time to live of the hazard event will have expired.

\* \* \* \* \*